Figure 1:
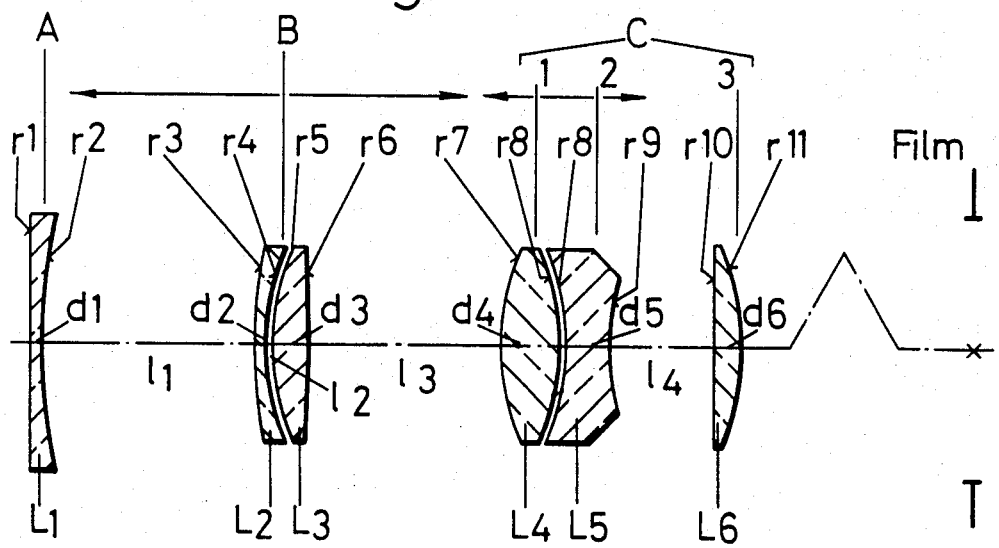

United States Patent
Bertele

[11] 4,099,844
[45] Jul. 11, 1978

[54] VARIABLE FOCAL LENS HAVING A DIVERGENT FRONT ELEMENT

[76] Inventor: Ludwig Bertele, ch-9658 Wildhaus, Switzerland

[21] Appl. No.: 727,232

[22] Filed: Sep. 27, 1976

[30] Foreign Application Priority Data
Sep. 29, 1975 [CH] Switzerland .................. 12625/75

[51] Int. Cl.² ........................................... G02B 15/14
[52] U.S. Cl. ................................................. 350/184
[58] Field of Search ........................ 358/184, 186

[56] References Cited
U.S. PATENT DOCUMENTS

| | | | |
|---|---|---|---|
| 2,741,947 | 4/1956 | Back | 350/184 |
| 3,051,052 | 8/1962 | Bergstein | 350/184 |

Primary Examiner—Paul A. Sacher
Attorney, Agent, or Firm—Melville, Strasser, Foster & Hoffman

[57] ABSTRACT

Variable focus lens systems having a fixed divergent lens element, a movable convergent lens component, and a basic objective lens group having a fixed lens element and a movable lens component, the movable lens component of the basic objective lens group being coupled to the convergent lens component for movement therewith in the same direction but over a proportionally lesser distance.

6 Claims, 2 Drawing Figures

VARIABLE FOCAL LENS HAVING A DIVERGENT FRONT ELEMENT

The invention relates to variable focus lenses consisting of a front element facing the longer beam length and possessing divergent refractive power, a lens component adapted to be displaced over a large air space end possessing convergent refractive power, and a basic objective.

Lenses having a displaceable convergent lens component are known. It has however been found that, for example, in still projection with a picture circle diameter of about 44 mm, in a focal length range of 60 to 120 mm the desired image sharpness can no longer be obtained in the two end positions of the moveable lens component in view of the small dimensions of a lens of this kind, so that suitable measures are necessary in order to obtain, within the focal length range of about double, a satisfactory picture quality.

According to the invention the solution of the problem is provided in that in addition to the moveable convergent lens component a part of the basic objective is also moved at the same time, this part being coupled to the convergent lens component in such a manner that it participates fractionally, and in the same direction, in the movement. If the lens is used for projection, the displacement of another lens component is unnecessary, because the focusing is effected manually by means of the entire lens.

It is generally known for additional lens elements to have to be moved in order to keep the focusing constant. In the case of the lens combination of the invention, however, the displacement of a part of the basic objective serves to effect optimum correction of image defects. Since the beam length is very great between the moveable part and the fixed part on the basic objective, the distance between the last lens surface and the film is scarcely affected by the movement.

Figure 2:
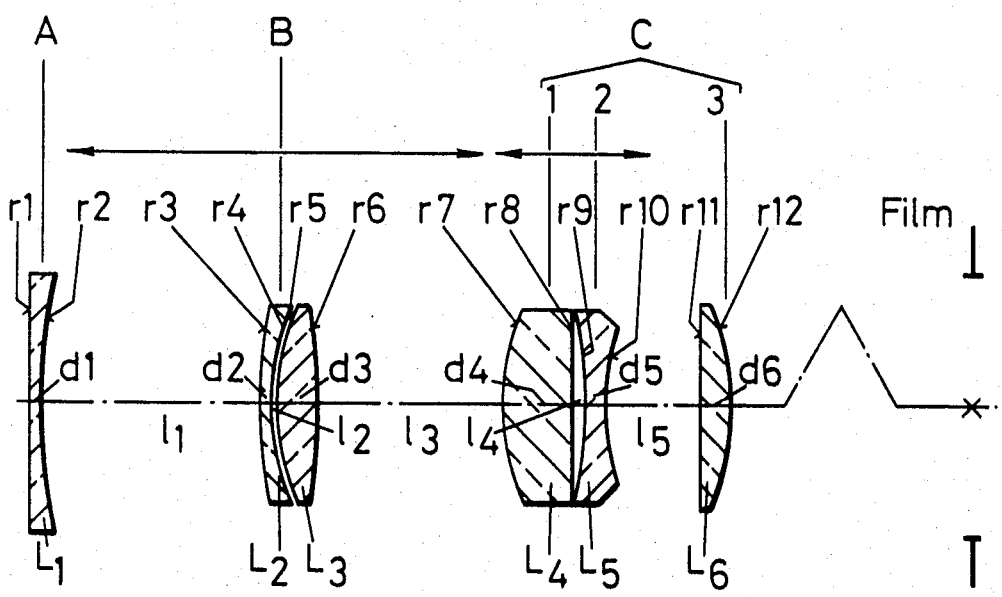

Examples of embodiment of the invention are illustrated in the accompanying drawing and the three Examples a, b and c. FIGS. 1 and 2 each show diagrammatically a different lens system embodying the invention. Further features of the invention can be seen therefrom. Like references are used for like parts. A designates the fixed divergent lens element, B the moveable convergent lens component, and C the basic objective of which the elements 1 and 2 are conjointly moved fractionally and in the same direction together with the lens component B.

The concave surface curved in the direction of the front element A and contiguous with air is designated $r_9$ in Example a and is designated $r_{10}$ in Examples b and c. In both Examples $r_7$ is the surface which is likewise convex in the direction of the front element. The remainder of the basic objective, that is to say the element 3 in these Examples, remains immovably oriented in relation to the front element.

In the three Examples the glass $L_1$ constitutes the divergent lens element A, the glasses $L_2$ and $L_3$ the moveable convergent lens component B, and the glasses $L_4$, $L_5$, and $L_6$ the elements 1 to 3 of the basic objective C.

Mutually facing lens surfaces of similar curvature, which are separated only by a small air space, may also be cemented, or cemented surfaces are split and separated by a small air space. This procedure comes within the scope of the invention.

In the Examples the lens component B is displaced to the extent of 72 mm and in addition the elements 1 and 2 of the basic objective are displaced by 7.5 mm in Example a and to the extent of 5 mm in Example b and c, in the same direction. The aperture ratio is 1 : 3.5 and the focal length range is from 62 mm to 115 mm.

EXAMPLE a (FIG. 1)

| | | | | |
|---|---|---|---|---|
| $L_1$ | $r_1 = -800$ | $d_1 = 2.0$ | 1,51680 | 64,2 |
| | $r_2 = +112.6$ | $l_1 = 0.5-72.5$ | | |
| $L_2$ | $r_3 = +96.0$ | $d_2 = 1.8$ | 1,69761 | 38.6 |
| | $r_4 = +40.0$ | $l_2 = 0.05$ | | |
| $L_3$ | $r_5 = +40.35$ | $d_3 = 6.0$ | 1,68900 | 49.5 |
| | $r_6 = -305.0$ | $l_3 = 65.0-0.5$ | | |
| $L_4$ | $r_7 = +40.0$ | $d_4 = 10.0$ | 1,57309 | 42.6 |
| | $r_8 = -36.8$ | | | |
| $L_5$ | $r_9 = +36.0$ | $d_5 = 8.5$ | 1.72047 | 34.6 |
| | | $l_4 = 21.0-13.5$ | | |
| $L_6$ | $r_{10} = -1600.0$ | $d_6 = 4.5$ | 1.65160 | 58.5 |
| | $r_{11} = -43.4$ | | | |

EXAMPLE b (FIG. 2)

| | | | | |
|---|---|---|---|---|
| $L_1$ | $r_1 = -1000.0$ | $d1 = 2.0$ | 1.51680 | 64.2 |
| | $r_2 = +110.4$ | $l_1 = 0.5-72.5$ | | |
| $L_2$ | $r_3 = +91.0$ | $d_2 = 1.8$ | 1.72373 | 36.1 |
| | $r_4 = +35.7$ | $l_2 = 0$ | Cemented | |
| $L_3$ | $r_5 = +35.7$ | $d_3 = 6.0$ | 1.68900 | 49.5 |
| | $r_6 = -308.0$ | $l_3 = 67.5-0.5$ | | |
| $L_4$ | $r_7 = +40.83$ | $d_4 = 12.0$ | 1.68273 | 44.5 |
| | $r_8 = +375.0$ | $l_4 = 1.7$ | | |
| $L_5$ | $r_9 = -83.0$ | $d_5 = 3.5$ | 1.68893 | 31.2 |
| | $r_{10} = +35.1$ | $l_5 = 18.0-13.0$ | | |
| $L_6$ | $r_{11} = +2400.0$ | $d_6 = 5.0$ | 1.65160 | 58.5 |
| | $r_{12} = -40.16$ | | | |

EXAMPLE c (FIG. 2)

| | | | | |
|---|---|---|---|---|
| $L_1$ | $r_1 = -800.0$ | $d_1 = 2.0$ | 1.51680 | 64.2 |
| | $r_2 = +112.6$ | $l_1 = 0.5-72.5$ | | |
| $L_2$ | $r_3 = +96.0$ | $d_2 = 1.8$ | 1.69761 | 38.6 |
| | $r_4 = +40.0$ | $l_2 = 0.05$ | | |
| $L_3$ | $r_5 = +40.45$ | $d_3 = 6.0$ | 1.68900 | 49.5 |
| | $r_6 = -300.0$ | $l_3 = 67.5-0.5$ | | |
| $L_4$ | $r_7 = +40.0$ | $d_4 = 12.5$ | 1.67003 | 47.1 |
| | $r_8 = +346.0$ | $l_4 = 1.4$ | | |
| $L_5$ | $r_9 = -85.75$ | $d_5 = 4.0$ | 1.68893 | 31.2 |
| | $r_{10} = +34.65$ | $l_5 = 18.0-13.0$ | | |
| $L_6$ | $r_{11} = +2300.0$ | $d_6 = 5.0$ | 1.65160 | 58.5 |
| | $r_{12} = -40.18$ | | | |

I claim:

1. A lens whose focal length is variable in about the double range, consisting of a front lens element (A) facing the longer beam length and having divergent refractive power, a lens component (B) displaceable over the airspace following thereon and having positive refractive power, and a basic objective (C) having positive refractive power, the lens components being constructed as follows:
  (a) the divergent front lens element contains a concavity facing in the direction of the shorter beam length of the lens;
  (b) the displaceable convergent lens component following thereon comprises at least a divergent meniscus facing the front element and a convergent glass whose more sharply curved surface faces the front element;
  (c) the basic objective consists of a fixed part, and a movable part having negative refractive power and which through the shape of its outer surfaces constitutes a meniscus curved in the direction of the front lens element, and at least a convergent glass and a biconcave glass facing the shorter beam length;
  (d) the displacement of the movable part of the basic objective amounts to only a fraction of that of the convergent lens component (B), and the two movable parts are coupled together in such a manner that this displacement takes place in the same direction;
  (e) the fixed part of the basic objective has a convergent action and its more sharply curved outer surface faces the shorter beam length.

2. A lens according to claim 1, wherein the v value of the divergent glass of the moveable convergent lens component (B) is lower than that of the convergent lens element following thereon.

3. A lens according to claim 1, wherein the v value of the convergent glass of the moveable part of the basic objective is higher than that of the divergent glass following thereon.

4. A lens according to claim 1, wherein the constructional data corresponds substantially to the following:

| | | | | |
|---|---|---|---|---|
| $L_1$ | $r_1 = -800$ | $d_1 = 2.0$ | 1.51680 | 64.2 |
| | $r_2 = +112.6$ | $l_1 = 0.5-72.5$ | | |
| $L_2$ | $r_3 = +96.0$ | $d_2 = 1.8$ | 1.69761 | 38.6 |
| | $r_4 = +40.0$ | $l_2 = 0.05$ | | |
| $L_3$ | $r_5 = +40.35$ | $d_3 = 6.0$ | 1.68900 | 49.5 |
| | $r_6 = -305.0$ | $l_3 = 65.0-0.5$ | | |
| $L_4$ | $r_7 = +40.0$ | $d_4 = 10.0$ | 1.57309 | 42.6 |
| | $r_8 = -36.8$ | | | |
| $L_5$ | $r_9 = +36.0$ | $d_5 = 8.5$ | 1.72047 | 34.6 |
| | $r_{10} = -1600.0$ | $l_4 = 21.0-13.5$ | | |
| $L_6$ | $r_{11} = -43.4$ | $d_6 = 4.5$ | 1.65160 | 58.5 |

5. A lens according to claim 1, wherein the constructional data corresponds substantially to the following:

| | | | | |
|---|---|---|---|---|
| $L_1$ | $r_1 = -1000.0$ | $d_1 = 2.0$ | 1.51680 | 64.2 |
| | $r_2 = +110.4$ | $l_1 = 0.5-72.5$ | | |
| $L_2$ | $r_3 = +91.0$ | $d_2 = 1.8$ | 1.72373 | 36.1 |
| | $r_4 = +35.7$ | $l_2 = 0$ | Cemented | |
| $L_3$ | $r_5 = +35.7$ | $d_3 = 6.0$ | 1.68900 | 49.5 |
| | $r_6 = -308.0$ | $l_3 = 67.5-0.5$ | | |
| $L_4$ | $r_7 = +40.83$ | $d_4 = 12.0$ | 1.68273 | 44.5 |
| | $r_8 = +375.0$ | $l_4 = 1.7$ | | |
| $L_5$ | $r_9 = -83.0$ | $d_5 = 3.5$ | 1.68893 | 31.2 |
| | $r_{10} = +35.1$ | $l_5 = 18.0-13.0$ | | |
| $L_6$ | $r_{11} = +2400.0$ | $d_6 = 5.0$ | 1.65160 | 58.5 |
| | $r_{12} = -40.16$ | | | |

6. A lens according to claim 1, wherein the constructional data corresponds substantially to the following:

| | | | | |
|---|---|---|---|---|
| $L_1$ | $r_1 = -800.0$ | $d_1 = 2.0$ | 1.516680 | 64.2 |
| | $r_2 = +112.6$ | $l_1 = 0.5-72.5$ | | |
| $L_2$ | $r_3 = +96.0$ | $d_2 = 1.8$ | 1.69761 | 38.6 |
| | $r_4 = +40.0$ | $l_2 = 0.05$ | | |
| $L_3$ | $r_5 = +4.45$ | $d_3 = 6.0$ | 1.68900 | 49.5 |
| | $r_6 = -300.0$ | $l_3 = 67.5-0.5$ | | |
| $L_4$ | $r_7 = +40.0$ | $d_4 = 12.5$ | 1.67003 | 47.1 |
| | $r_8 = +346.0$ | $l_4 = 1.4$ | | |
| $L_5$ | $r_9 = -85.75$ | $d_5 = 4.0$ | 1.68893 | 31.2 |
| | $r_{10} = +34.65$ | $l_5 = 18.0-13.0$ | | |
| $L_6$ | $r_{11} = +2300.0$ | $d_6 = 5.0$ | 1.65160 | 58.5 |
| | $r_{12} = -40.18$ | | | |

* * * * *